(12) United States Patent
Kim et al.

(10) Patent No.: US 11,971,558 B2
(45) Date of Patent: Apr. 30, 2024

(54) SPATIAL LIGHT MODULATOR, BEAM STEERING APPARATUS INCLUDING THE SAME, AND METHOD OF MANUFACTURING THE SPATIAL LIGHT MODULATOR

(71) Applicant: SAMSUNG ELECTRONICS CO., LTD., Suwon-si (KR)

(72) Inventors: Sunil Kim, Hwaseong-si (KR); Junghyun Park, Seoul (KR); Duhyun Lee, Yongin-si (KR); Byunggil Jeong, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 722 days.

(21) Appl. No.: 17/166,641

(22) Filed: Feb. 3, 2021

(65) Prior Publication Data

US 2022/0057642 A1   Feb. 24, 2022

(30) Foreign Application Priority Data

Aug. 19, 2020   (KR) .......................... 10-2020-0104156

(51) Int. Cl.
*G02B 27/10* (2006.01)
*G01S 7/481* (2006.01)

(52) U.S. Cl.
CPC ........ *G02B 27/1026* (2013.01); *G01S 7/4814* (2013.01)

(58) Field of Classification Search
CPC ............ G02B 27/1026; G02B 26/0816; G02B 26/106; G02B 6/125; G02B 6/1225; G02B 6/34; G01S 7/4814; G01S 7/4817; G01B 6/124; F02B 2006/12107; G02F 1/295; G02F 1/2995; G02F 1/292; G01N 21/49
USPC ....................................................... 359/290
See application file for complete search history.

(56) References Cited

U.S. PATENT DOCUMENTS

| | | |
|---|---|---|
| 9,711,697 B2 * | 7/2017 | Vassant .................. H01L 33/06 |
| 2018/0196138 A1 * | 7/2018 | Lee ............................ G02F 1/21 |
| 2018/0246390 A1 | 8/2018 | Park et al. |
| 2019/0369458 A1 | 12/2019 | Shorokhov et al. |
| 2020/0025893 A1 * | 1/2020 | Jang ........................ G01S 17/08 |
| 2020/0393794 A1 | 12/2020 | Kroll et al. |

FOREIGN PATENT DOCUMENTS

| KR | 10-2010-0017785 A | 2/2010 |
|---|---|---|
| KR | 10-2030696 B1 | 10/2019 |

* cited by examiner

*Primary Examiner* — Stephone B Allen
*Assistant Examiner* — Leonidas Boutsikaris
(74) *Attorney, Agent, or Firm* — Sughrue Mion, PLLC

(57) ABSTRACT

A spatial light modulator and a beam steering apparatus including the same are provided. The spatial light modulator includes a first reflective layer; a cavity layer provided on the first reflective layer; and a reflective layer including a plurality of unit lattice structures that are provided on the cavity layer are and spaced apart from each other. Each of the plurality of unit lattice structures has a polycrystalline structure, and at least one grain of the polycrystalline structure has a column shape and a height equal to a height of the plurality of unit lattice structures.

20 Claims, 20 Drawing Sheets

SPATIAL LIGHT MODULATOR, BEAM STEERING APPARATUS INCLUDING THE SAME, AND METHOD OF MANUFACTURING THE SPATIAL LIGHT MODULATOR

CROSS-REFERENCE TO RELATED APPLICATION

This application claims priority to Korean Patent Application No. 10-2020-0104156, filed on Aug. 19, 2020, in the Korean Intellectual Property Office, the disclosure of which is incorporated by reference herein in its entirety.

BACKGROUND

1. Field

Apparatuses and methods consistent with example embodiments relate to a spatial light modulator capable of increasing a beam steering speed, a beam steering apparatus including the spatial light modulator, and a method of manufacturing the spatial light modulator.

2. Description of Related Art

An advanced driving assistance system (ADAS) having various functions has been commercialized. For example, there is an increased demand for vehicles having functions such as adaptive cruise control (ACC) for recognizing a position and a speed of another vehicle to reduce a speed of a driver's vehicle when there is a risk of collision and to drive the vehicle within a set speed range when there is no risk of collision, and an autonomous emergency braking system (AEB) for detecting another vehicle in front of a driver's vehicle and automatically stopping the driver's vehicle to prevent collision when the driver does not respond to a risk of collision or a response method to the risk of collision is not proper. In addition, it is expected that vehicles capable of autonomously driving will be commercialized in the near future.

Accordingly, there is an increasing interest in optical measurement devices capable of providing information around a vehicle. For example, a light detection and ranging (LiDAR) device mounted in a vehicle emits a laser beam to a selected region around the vehicle and detects a reflected laser beam to provide information on a distance to an object around the vehicle, a relative speed, an azimuth angle, and so on. To this end, the LiDAR device includes a beam steering apparatus capable of steering light to a desired region.

The beam steering apparatus may be divided into a mechanical beam steering apparatus and a non-mechanical beam steering apparatus. For example, the mechanical beam steering apparatus uses a method of rotating a light source, a method of rotating a mirror that reflects light, a method of moving a spherical lens in a direction perpendicular to an optical axis, and so on. In addition, the non-mechanical beam steering apparatus uses a method of using a semiconductor element and a method of electrically controlling an angle of reflected light by using a reflective phased array.

SUMMARY

One or more example embodiments provide a spatial light modulator capable of increasing a beam steering speed and a beam steering apparatus including the spatial light modulator.

One or more example embodiments also provide a method of manufacturing a spatial light modulator capable of increasing a beam steering speed.

According to an aspect of an example embodiment, there is provided a spatial light modulator including: a first reflective layer; a cavity layer provided on the first reflective layer; and a second reflective layer including a plurality of unit lattice structures that are provided on the cavity layer and spaced apart from each other, wherein each of the plurality of unit lattice structures may have a polycrystalline structure, and at least one grain of the polycrystalline structure may have a column shape and a height equal to a height of the plurality of unit lattice structures.

Each of the plurality of unit lattice structures may have the polycrystalline structure in which a number of grains is 5 or less.

A width of each of the plurality of unit lattice structures may be 500 nm or less, and a width of the at least one grain may be 100 nm or more.

The plurality of unit lattice structures may include silicon (Si).

The plurality of unit lattice structures may be PIN diodes.

The second reflective layer may further include a dielectric material that is filled between the plurality of unit lattice structures and has a refractive index less than refractive indices of the plurality of unit lattice structures.

The cavity layer may include silicon oxide ($SiO_2$).

The first reflective layer may be a distributed Bragg reflector.

The first reflective layer may include first layers and second layers that are alternately stacked with each other. The first layers may include one of silicon (Si), silicon nitride ($Si_3N_4$), silicon oxide ($SiO_2$), and titanium oxide ($TiO_2$), and the second layers may include another one of silicon (Si), silicon nitride ($Si_3N_4$), silicon oxide ($SiO_2$), and titanium oxide ($TiO_2$).

According to an aspect of another example embodiment, there is provided a beam steering apparatus including: a light source configured to emit light; the spatial light modulator which is configured to transmit the light to an object by adjusting a travelling direction of the light emitted from the light source; a photodetector configured to detect the light reflected from the object; and a controller configured to control the spatial light modulator.

According to an aspect of another example embodiment, there is provided a method of manufacturing a spatial light modulator, the method including: providing a cavity layer on a first reflective layer; and providing a second reflective layer on the cavity layer, the second reflective layer including a plurality of unit lattice structures that are spaced apart from each other, wherein, the providing of the second reflective layer may include performing a heat treatment so that each of the plurality of unit lattice structures has a polycrystalline structure and at least one grain of the polycrystalline structure has a column shape and a height equal to a height of the plurality of unit lattice structures.

The providing of the second reflective layer may further include: depositing a semiconductor layer on the cavity layer; patterning the semiconductor layer to form the plurality of unit lattice structures spaced apart from each other; and applying the heat treatment to the plurality of unit lattice structures.

The applying the heat treatment may include: heating the plurality of unit lattice structures at a temperature of 500° C. to 650° C. for 8 hours to 12 hours.

The applying the heat treatment may further include: heating the plurality of unit lattice structures at a temperature of at least 750° C. within 10 minutes.

Each of the plurality of unit lattice structures may have the polycrystalline structure in which a number of grains is 5 or less.

A width of each the plurality of unit lattice structures may be 500 nm or less, and a width of the at least one grain may be 100 nm or more.

The method may further include forming a dielectric between the plurality of unit lattice structures, the dielectric having a refractive index less than refractive indices of the plurality of unit lattice structures.

The plurality of unit lattice structures may be PIN diodes.

The cavity layer may include silicon oxide ($SiO_2$).

The first reflective layer may be a distributed Bragg reflector.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
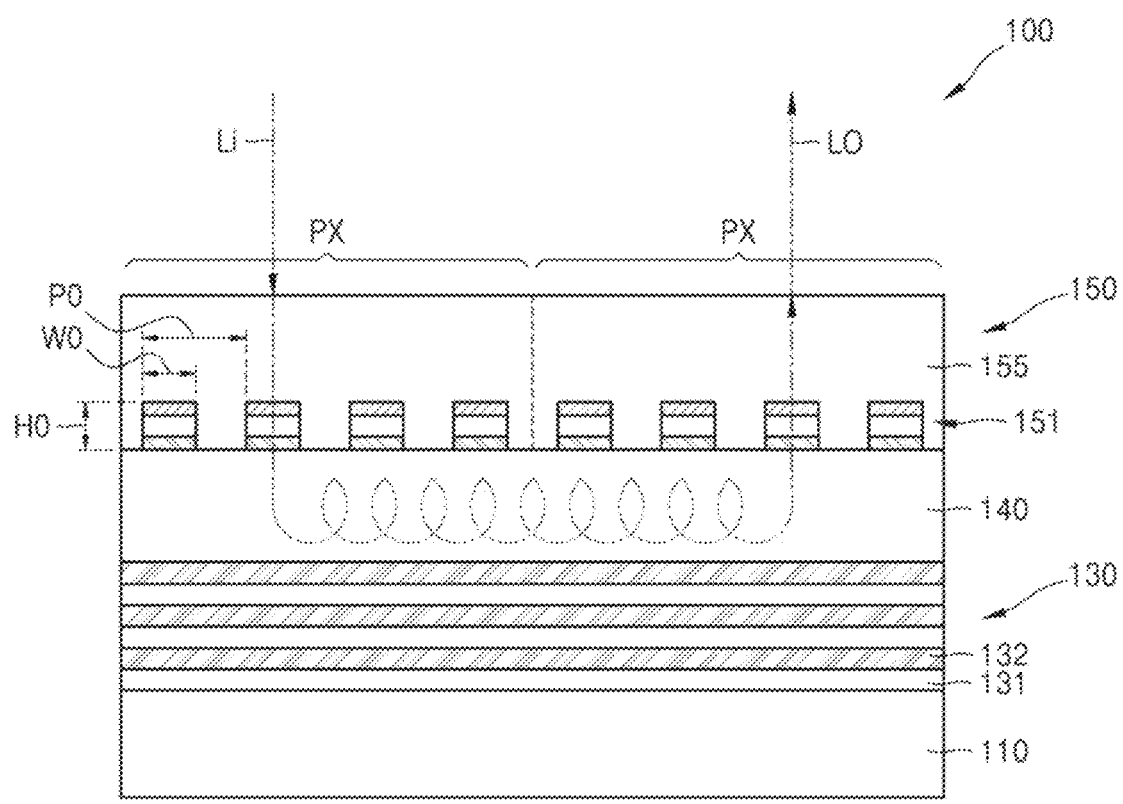
FIG. 1 is a view conceptually illustrating a spatial light modulator according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Hereinafter, a spatial light modulator and a beam steering apparatus including the spatial light modulator according to various embodiments will be described in detail with reference to the accompanying drawings. In the drawings, like reference numerals refer to like elements, and a size of each element in the drawings may be exaggerated for clarity and convenience of description. The terms "first", "second", and the like may be used to describe various configuration elements, and the configuration elements should not be limited by the terms. Terms are only used for the purpose of distinguishing one configuration element from another configuration element.

A singular expression includes plural expressions unless the context clearly indicates otherwise. In addition, when a part is described to "include" a certain configuration element, which means that the part may further include other configuration elements, except to exclude other configuration elements unless otherwise stated. In addition, a size and a thickness of each element in the drawings may be exaggerated for clarity and convenience of description. In addition, when it is described that a certain material layer exists on a substrate or another layer, the material layer may exist in direct contact with the substrate or a second layer, or a third layer may exist therebetween. In addition, in the embodiments below, materials forming each layer are examples, and thus, other materials may be used.

In addition, a term " . . . unit", " . . . module", or the like described in the specification means a unit for processing at least one function or operation, which may be implemented by hardware or software, or a combination of the hardware and the software.

Certain implementations described in the present embodiment are examples, and do not limit the technical scope in any way. For the sake of the brief specification, descriptions on electronic configurations of related art, control systems, software, and other functional aspects of the systems may be omitted. In addition, connections of lines between configuration elements or connection members illustrated in the drawings represent functional connections and/or physical or circuit connections by way of example and may be replaced or represented as additional various functional connections, physical connections, or circuit connections in the actual device.

The use of a term "the above-described" and similar instruction terms may correspond to both the singular and the plural.

The steps constituting the method may be performed in any suitable order unless there is a clear statement that the steps should be performed in the order described. In addition, all exemplary terms (for example, and so on) are used simply for the purpose of describing technical concepts in detail, and the scope is not limited by the terms unless limited by the claims.

Figure 2:
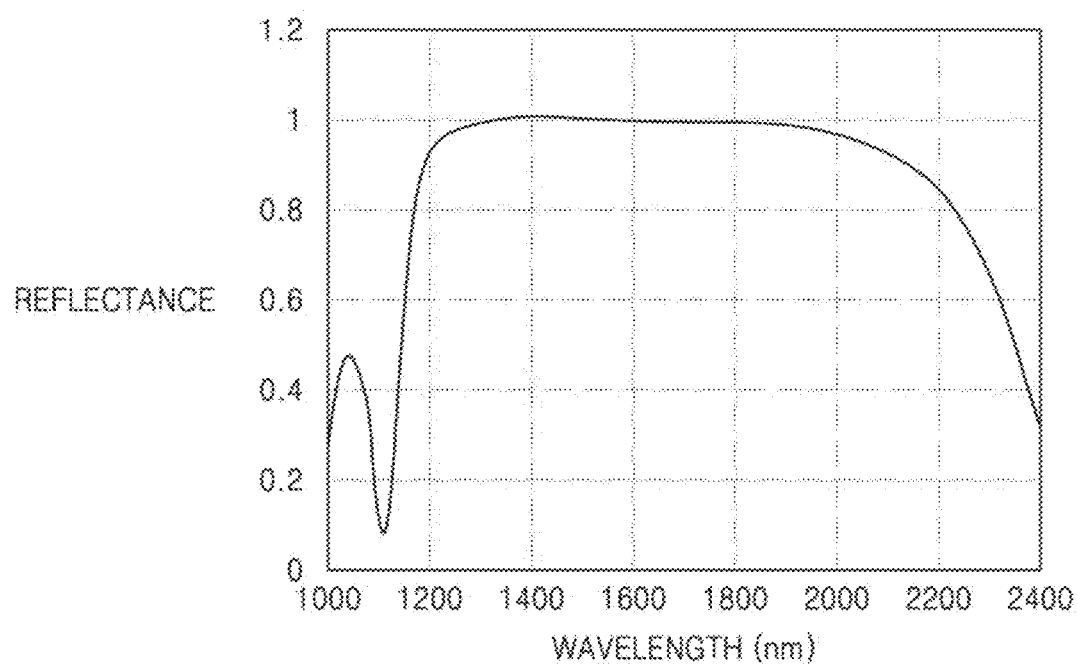
FIG. 2 illustrates a reflection spectrum when a first reflective layer is a distributed Bragg reflector.
Figure 3:
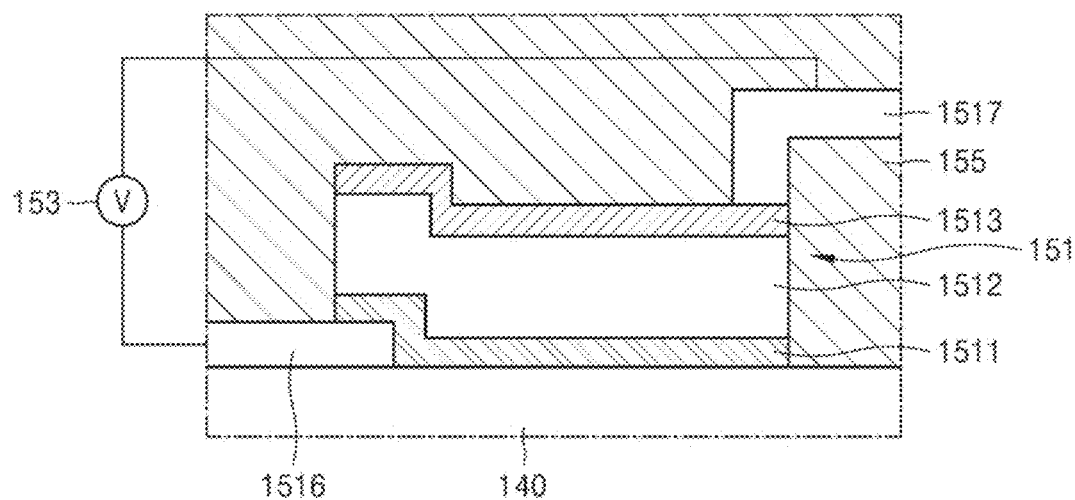
FIG. 3 is a view conceptually illustrating a unit lattice structure material of FIG. 1.

FIG. 1 is a view conceptually illustrating a spatial light modulator 100 according to an example embodiment, and FIG. 2 illustrates a reflection spectrum of a first reflective layer 130 of FIG. 1. FIG. 3 is a view conceptually illustrating a unit lattice structure material 151 of FIG. 1.

Referring to FIG. 1, the spatial light modulator 100 may include a first reflective layer 130, a second reflective layer 150, and a cavity layer 140 provided between the first reflective layer 130 and the second reflective layer 150.

The spatial light modulator 100 may modulate a phase of an incident light Li and outputs the modulated phase. The spatial light modulator 100 may include a plurality of pixels PX. The pixel PX may be a unit for independently driving the spatial light modulator 100. Alternatively, the pixel PX may represent a basic unit for independently modulating a phase of light. One second reflective layer 150 may be arranged in the pixel PX, or a plurality of the second reflective layers 150 may be arranged in the pixel PX.

The first reflective layer 130 may be arranged on a substrate 110.

The substrate 110 may be a transparent substrate 110 that transmits light. For example, the substrate 110 may be a silicon substrate or a glass substrate. However, the substrate 110 is not limited thereto and may be a substrate 110 composed of various materials. In addition, the substrate 110 corresponds to an optional configuration and may be removed if necessary.

The first reflective layer 130 may be a distributed Bragg reflector. For example, the first reflective layer 130 may be formed by alternately stacking a first layer 131 and a second layer 132 having different refractive indices a plurality of times. Waves reflected from an interface of each layer may interfere with each other due to a difference in refractive index. The first reflective layer 130 may have a structure in which layers including two of, for example, silicon (Si), silicon nitride ($Si_3N_4$), silicon oxide ($SiO_2$), and titanium oxide ($TiO_2$) are alternately stacked. The first reflective layer 130 may have a structure in which, for example, a silicon (Si) layer and a silicon oxide ($SiO_2$) layer are alternately stacked. Light reflectance may be adjusted according to a thickness and the number of stacks of the first and second layers 131 and 132 of the first reflective layer 130.

In the above-described embodiment, a distributed Bragg reflector is mainly described as an example of the first reflective layer 130, but embodiments are not limited thereto. For example, at least one surface of the first reflective layer 130 may be a metal reflector formed of metal.

FIG. 2 illustrates a reflection spectrum when the first reflective layer 130 is a distributed Bragg reflector. The reflection spectrum illustrates reflectance according to a wavelength of light. The first reflective layer 130 may be a distributed Bragg reflector in which three pairs of a silicon (Si) layer and a silicon oxide ($SiO_2$) layer are stacked. Referring to FIG. 2, the first reflective layer 130 exhibits high reflectance close to approximately 1 in a range from 0 (0% reflectance) to 1 (100% reflectance), in a section from approximately 1400 nm to approximately 1800 nm.

Referring back to FIG. 1, the cavity layer 140 may be arranged on the first reflective layer 130. The cavity layer 140 may be arranged between the first reflective layer 130 and the second reflective layer 150 and functions as a resonant layer in which light resonates.

The cavity layer 140 may include, for example, silicon oxide ($SiO_2$). A resonance wavelength may be determined according to a thickness of the cavity layer 140. As a thickness of the cavity layer 140 is great, a resonance wavelength of light may be long, and as the thickness of the cavity layer 140 is small, the resonance wavelength of light may be short.

In the second reflective layer 150, a plurality of unit lattice structures 151 may be arranged to be spaced apart from each other at predetermined intervals. The second reflective layer 150 may be referred to as a grating reflector. Reflectance of the second reflective layer 150 may be different from the reflectance of the first reflective layer 130.

Reflection and transmission of light may be adjusted by adjusting a width, a height, and a pitch of the plurality of unit lattice structures 151.

A width W0 of the unit lattice structure material 151 may be 300 nm to 500 nm. A height H0 of the unit lattice structure material 151 may be 550 nm to 650 nm. A pitch P0 of the unit lattice structure material 151 may be 700 nm to 770 nm. However, the width W0, the height H0, and the pitch P0 of the unit lattice structure material 151 are not limited thereto and may vary depending on wavelengths of light.

The unit lattice structure material 151 may have a refractive index greater than refractive indices of surrounding materials. For example, the unit lattice structure material 151 may be formed of silicon. However, a material of the unit lattice structure material 151 is not limited thereto.

The second reflective layer 150 may further include a dielectric 155 filled between the plurality of unit lattice structures 151. The dielectric 155 may have a refractive index smaller than the refractive indices of the plurality of unit lattice structures 151. For example, when the unit lattice structure material 151 includes silicon, the dielectric 155 may include silicon oxide. The dielectric 155 may be formed of the same material as the cavity layer 140. The dielectric 155 not only may increase a refractive index of the second reflective layer 150, but also may protect the plurality of unit lattice structures 151 during a manufacturing step.

When light is incident toward the first reflective layer 130 of the spatial light modulator 100 according to the embodiment described above, incident light is repeatedly reflected between the first reflective layer 130 and the second reflective layer 150 and light (Lo) of a certain phase may be outputted. The certain phase may be controlled by a current supplied to the second reflective layer 150. The incident light Li may pass through the second reflective layer 150 in a vertical direction, and may propagate through the cavity layer 140 in a horizontal direction. The first reflective layer (including the distributed Bragg reflector) 130 and the second reflective layer 150 may reflect the incident light Li, and thereby have the incident light Li resonated and trapped in the cavity layer 140, and then emitted through the second reflective layer 150.

FIG. 3 is a conceptual view illustrating the unit lattice structure material 151 according to an example embodiment. Referring to FIG. 3, the unit lattice structure material 151 may be connected to a power supply unit (e.g., a power supply, a voltage source, and/or a current source) 153 and a current may flow therethrough.

The unit lattice structure material 151 may be a PIN diode. For example, the unit lattice structure material 151 may include a p-type semiconductor region 1513, an n-type semiconductor region 1511, and an undoped intrinsic semiconductor region 1512 arranged between the p-type semiconductor region 1513 and the an n-type semiconductor region 1511. A height of each of the p-type semiconductor region 1513 and the n-type semiconductor region 1511 may be 50 nm to 200 nm, and a height of the intrinsic semiconductor region 1512 may be 100 nm to 600 nm.

As an example, when the unit lattice structure material 151 includes silicon (Si), the unit lattice structure material 151 may include a p-type silicon region, an intrinsic silicon region, and an n-type silicon region.

In the unit lattice structure material 151, the n-type semiconductor region 1511, the intrinsic semiconductor region 1512, and the p-type semiconductor region 1513 may be arranged in a height direction and may be connected to an upper wire 1517 and a lower wire 1516. In FIG. 3, an example in which the n-type semiconductor region 1511 is arranged below and the p-type semiconductor region 1513 is arranged above is described, but the unit lattice structure material 151 is not limited thereto, and the upper and lower positions may be changed as necessary. For example, in the unit lattice structure material 151, the p-type semiconductor region 1513 may be arranged below and the n-type semiconductor region 1511 may be arranged above.

A refractive index of the second reflective layer 150 may vary depending on currents flowing through the unit lattice structure material 151. The refractive index of the second reflective layer 150 may be changed depending on the currents, and resonance characteristics may be changed depending on changes of the refractive index, and thus, a phase of the light Lo emitted to the outside may be adjusted. Further, reflectance of the second reflective layer 150 may be adjusted by the flowing current.

However, as described above, the phase of the emitted light Lo varies depending on currents flowing through the unit lattice structure material 151, and thus, when the current flowing through the unit lattice structure material 151 is small, the phase of the light Lo emitted from the spatial light modulator 100 may be reduced.

Figure 4:
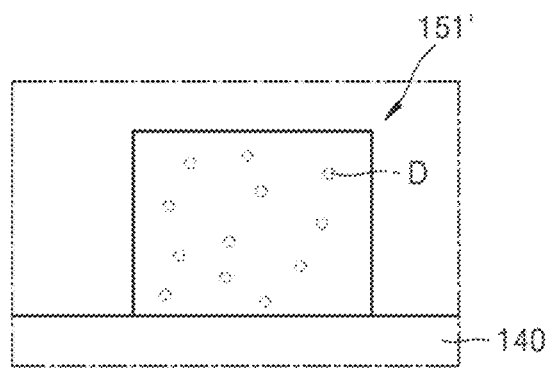
FIGS. 4 and 5 are views conceptually illustrating a crystal structure of a unit lattice structure material according to a comparative example.
Figure 5:
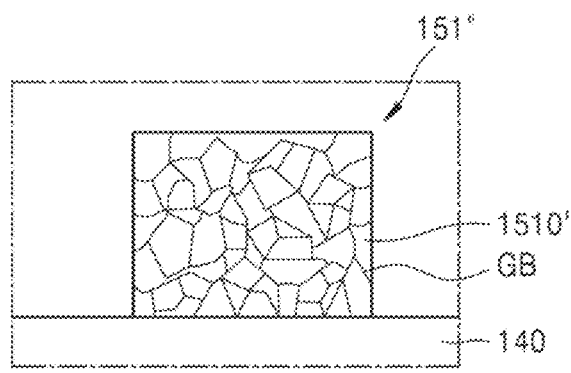

FIGS. 4 and 5 conceptually illustrate crystal structures of unit lattice structures 151' and 151" according to a comparative example. For example, the unit lattice structures 151' and 151" may be an amorphous structure illustrated in FIG. 4 or a polycrystalline structure of small grains 1510' illustrated in FIG. 5. A polycrystalline structure of the small grains 1510' may be a crystal structure of the grains 1510' having sizes smaller than 50 nm. In the unit lattice structures 151' and 151", carriers may be trapped due to a plurality of grain boundaries GB or a plurality of defects D, and accordingly, a current that may cause a large change in refractive index, may not flow through the unit lattice structure material 151.

In consideration of this point, the spatial light modulator 100 according to the embodiment may provide the unit lattice structure material 151 having a columnar polycrystalline structure which has relatively less grain boundaries GB and defects D, and thereby a current that causes a relatively large change in refractive index in the second reflective layer 150, may flow through the polycrystalline structure.

Figure 6:
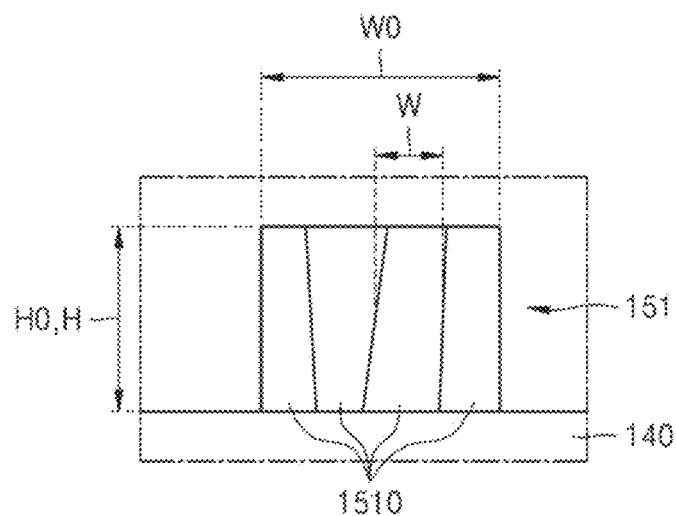
FIG. 6 is a view illustrating a crystal structure of a unit lattice structure material according to an example embodiment.

FIG. 6 is a view illustrating a crystal structure of the unit lattice structure material 151 according to the example embodiment. At least some of the plurality of unit lattice structures 151 may have a crystal structure illustrated in FIG. 6.

Referring to FIG. 6, the unit lattice structure material 151 may have a polycrystalline structure, and at least some grains 1510 of the polycrystalline structure may have a column shape, and a height H thereof may be equal to the height H0 of the unit lattice structure material 151. The height H0 of the unit lattice structure material 151 may be set based in the height H of the grain 1510.

The grain 1510 may have the height H greater than a width W to have a column shape or a cylindrical pillar shape. For example, the height H of the grain 1510 may be greater than the width W of the grain 1510 by two or more times. For example, the height H of the grain 1510 may be greater than the width W of the grain 1510 by five or more times. For example, the height H of the grain 1510 may be greater than the width W of the grain 1510 by seven or more times. For example, the height H of the grain 1510 may be greater than the width W of the grain 1510 by ten or more times. However, the height H of the grain 1510 may be less than the width W of the grain 1510 by 20 or more times.

A crystal structure of the unit lattice structure material 151 may be formed by a heat treatment. A heat treatment method will be described below when describing FIG. 11F.

The grain 1510 has an end portion in contact with the cavity layer 140 and extends in a direction away from the cavity layer 140. The height H of the grain 1510 may be 550 nm to 650 nm.

The unit lattice structure material 151 may have a polycrystalline structure in which the number of grains 1510 is 10 or less. For example, the unit lattice structure material 151 may have a polycrystalline structure in which the number of grains 1510 is 7 or less. For example, the unit lattice structure material 151 may have a polycrystalline structure in which the number of grains 1510 is 5 or less.

The width W of the grain 1510 may be $1/10$ to $1/2$ of the width W0 of the unit lattice structure material 151. For example, the width W of the grain 1510 may be $1/5$ or more of the width W0 of the unit lattice structure material 151. When the width W0 of the unit lattice structure material 151 is 500 nm or less, the width W of the grain 1510 may be 100 nm or more. Here, when the width W of the grain 1510 changes toward a height direction, the width W may be defined as an average width. When the width W of the grain 1510 is reduced, the width W of the grain 1510 may be greater than 50 nm in consideration of an increase in resistance of the unit lattice structure material 151.

Figure 7:
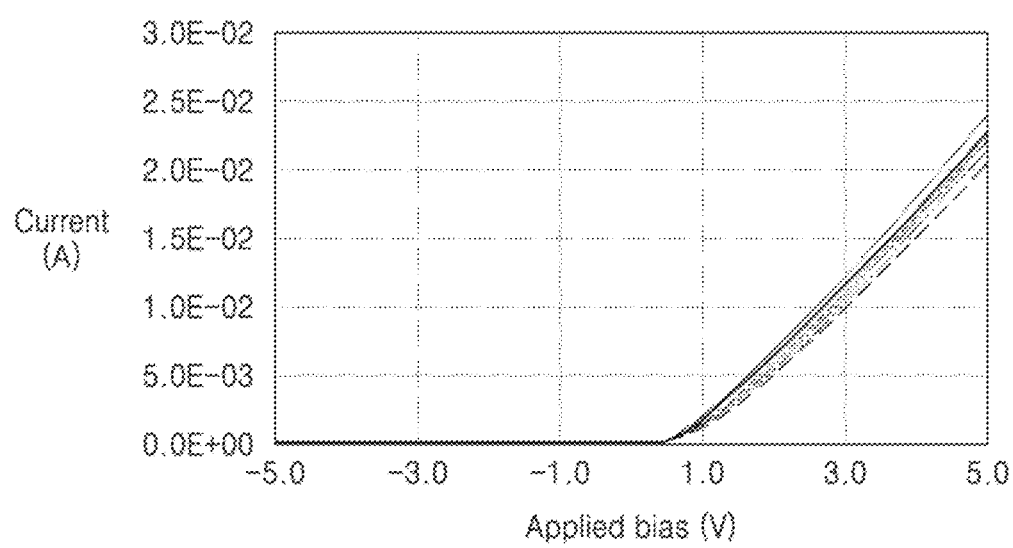
FIG. 7 is a graph illustrating current characteristics of a unit lattice structure material having grains of a column shape as illustrated in FIG. 6.
Figure 8:
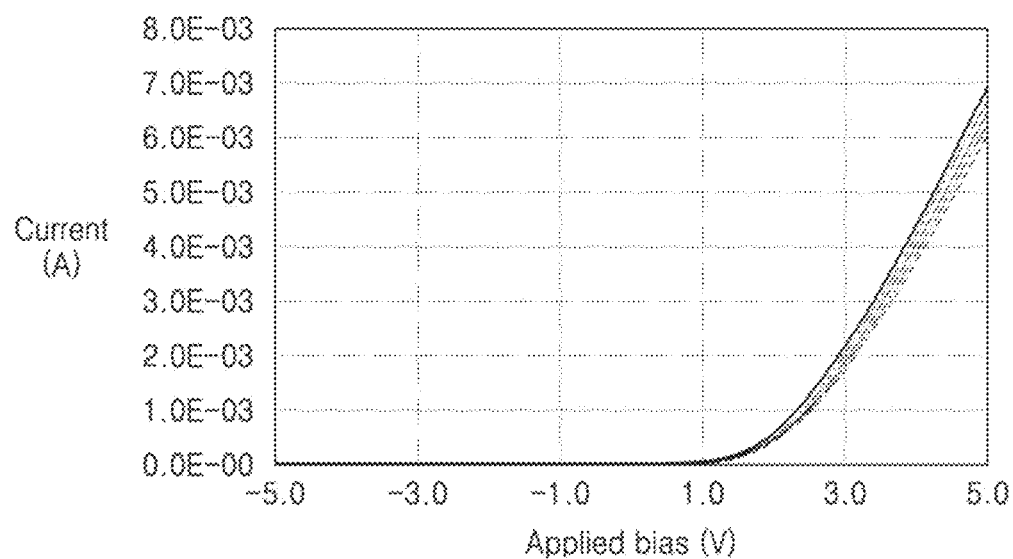
FIG. 8 is a graph illustrating current characteristics of a unit lattice structure material having a polycrystalline structure as illustrated in FIG. 5.
Figure 9:
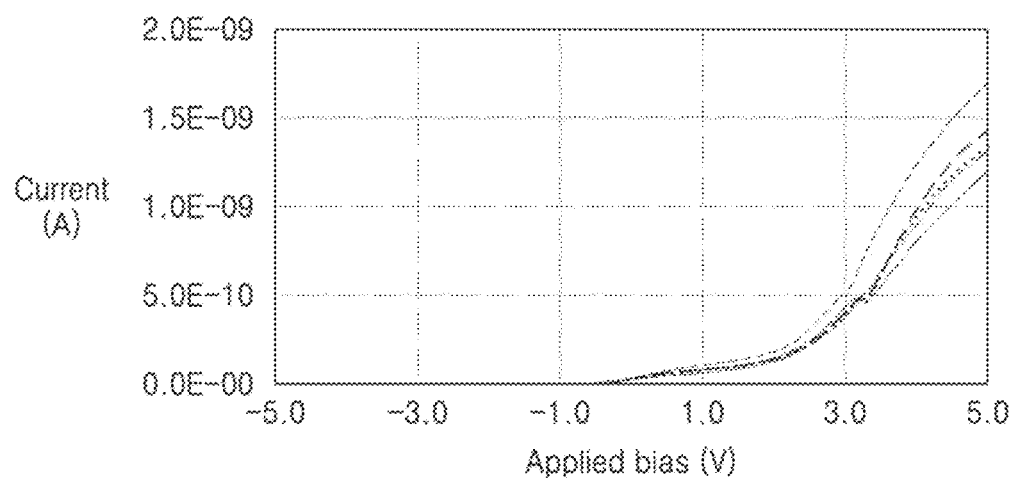
FIG. 9 is a graph illustrating current characteristics of a unit lattice structure material having an amorphous structure as illustrated in FIG. 4.

FIG. 7 is a graph illustrating current characteristics of the unit lattice structure material 151 having the grains 1510 of a column shape of FIG. 6, FIG. 8 is a graph illustrating current characteristic of the unit lattice structure material 151 having the polycrystalline structure of FIG. 5, and FIG. 9 is a graph illustrating current characteristics of the unit lattice structure material 151 having an amorphous structure of FIG. 4. Current characteristics illustrated in FIGS. 7 to 9 are resulted from measurement of a plurality of regions inside the unit lattice structure material 151 in which conditions other than the crystal structure of the unit lattice structure material 151 are the same.

Referring to FIG. 7, current characteristic of the second reflective layer 150 including the unit lattice structure material 151 having the grains 1510 of a column shape according to the embodiment are represented as $2 \times 10^{-2}$ amperes at 5 volts. The x-axis of the graph shown in FIG. 7 may indicate a voltage of the power supply unit 153. Meanwhile, referring to FIG. 8, current characteristic of the unit lattice structure material 151" having a polycrystalline structure of small grains 1510" according to a first comparative example are represented as $7 \times 10^{-3}$ amperes at 5 volts. Referring to FIG. 9, current characteristic of the unit lattice structure material 151' having an amorphous structure according to a second comparative example is represented as $1 \times 10^{-9}$ amperes at 5 volts.

As described above, even when the same voltage is applied to the same unit lattice structure material 151, a current of 3 times to $2 \times 10^7$ times may flow through the unit lattice structure material 151 having the grains 1510 of a column shape compared to the unit lattice structure material 151' having an amorphous structure or the unit lattice structure material 151" having a polycrystalline structure of the small grains 1510'. Accordingly, as a crystal structure of the unit lattice structure material 151 has the grains 1510 of a column shape, the spatial light modulator 100 may provide a relatively high phase, compared with the first comparative example and the second comparative example. A beam steering apparatus including the spatial light modulator 100 may increase a steering speed and efficiency of a beam.

Figure 10:
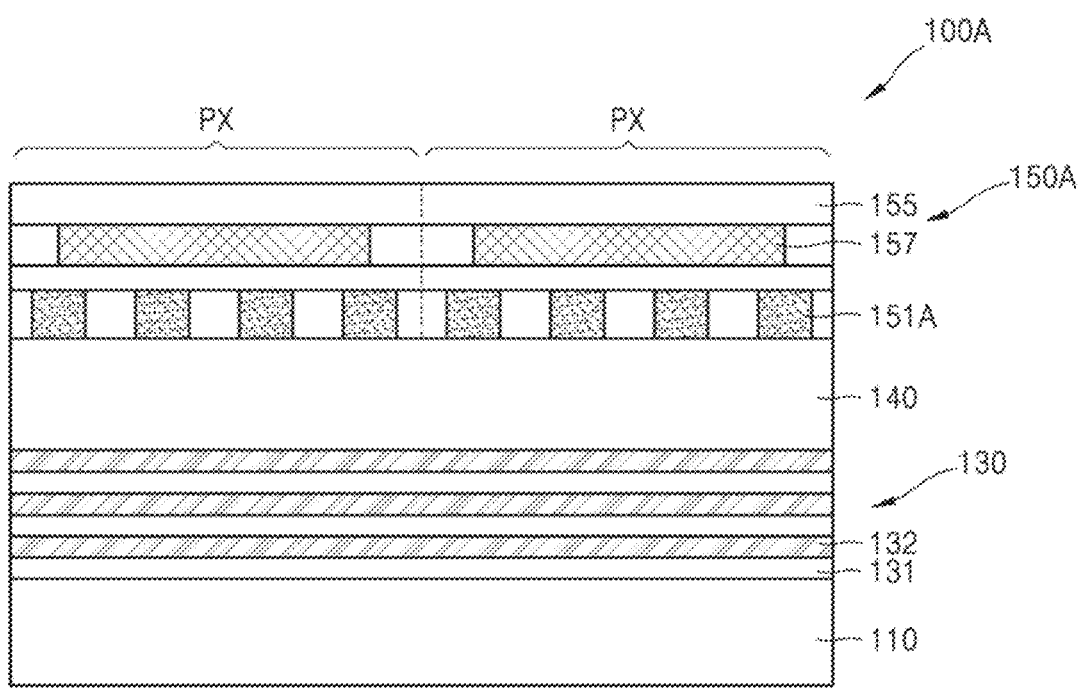
FIG. 10 is a view conceptually illustrating a spatial light modulator according to another example embodiment.

In the embodiment described above, an example in which the unit lattice structure material 151 is a PIN diode, and reflectance of the second reflective layer 150 changes depending on currents flowing therethrough is described but is not limited thereto. For example, as illustrated in FIG. 10, a unit lattice structure material 151A of a light modulator 100A may be formed of a material of which refractive index changes depending on temperatures, and reflectance of the second reflective layer 150A may change depending on temperatures of a heater 157.

FIGS. 11A to 11F are views illustrating a method of manufacturing the spatial light modulator 100 according to the example embodiment.

Figure 11A:
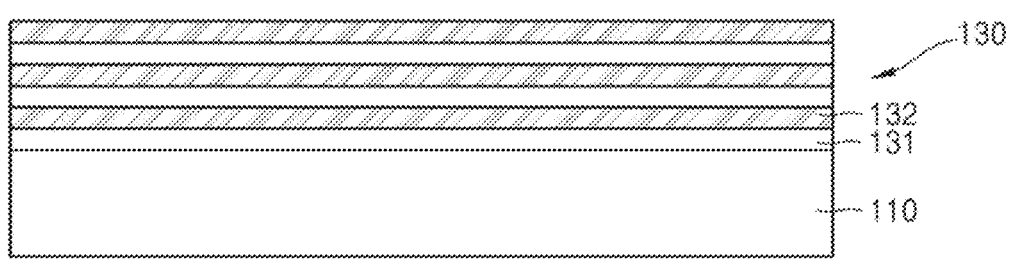
FIGS. 11A to 11F are views illustrating a method of manufacturing a spatial light modulator according to an example embodiment.

Referring to FIG. 11A, the first reflective layer 130 is arranged on the substrate 110.

The substrate 110 may be a transparent substrate 110 that transmits light. For example, the substrate 110 may be a silicon substrate 110 or a glass substrate 110. However, the substrate 110 is not limited thereto and may be a substrate 110 formed of various materials.

The first reflective layer 130 may be a distributed Bragg reflector. For example, the first reflective layer 130 may be formed by alternately stacking the first layer 131 and the second layer 132 having different refractive indices a plurality of times. Waves reflected from an interface of each layer may interfere with each other due to a difference in refractive index.

The first reflective layer 130 may have a structure in which layers including two of, for example, silicon (Si), silicon nitride ($Si_3N_4$), silicon oxide ($SiO_2$), and titanium oxide ($TiO_2$) are alternately stacked. The first reflective layer 130 may have a structure in which, for example, a silicon (Si) layer and a silicon oxide (SiO2) layer are alternately stacked. Reflectance of light may be adjusted by a thickness and the number of stacks of the first and second layers 131 and 132 of the first reflective layer 130.

In the embodiment described above, the distributed Bragg reflector is mainly described as an example of the first reflective layer 130, and embodiments are not limited thereto. For example, at least one surface of the first reflective layer 130 may be a metal reflector formed of metal.

Figure 11B:
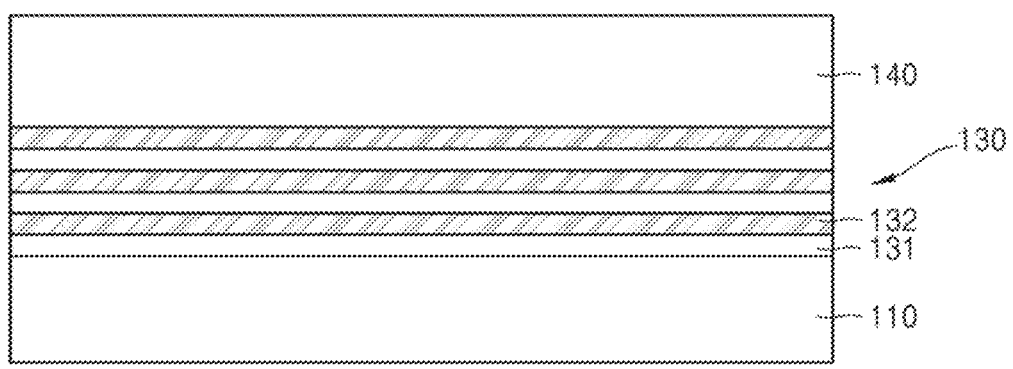

Referring to FIG. 11B, the cavity layer 140 may be arranged on the first reflective layer 130. The cavity layer 140 may include, for example, silicon oxide ($SiO_2$). A resonance wavelength may be determined by a thickness of the cavity layer 140. As the thickness of the cavity layer 140 is increased, the resonance wavelength of light may become long, and as the thickness of the cavity layer 140 is reduced, the resonance wavelength of light may become short.

Referring to FIGS. 11C to 11F, a semiconductor layer 152 may be deposited on the cavity layer 140 to form the second reflective layer 150 having the plurality of unit lattice structures 151 on the cavity layer 140 as shown in FIG. 1.

Figure 11C:
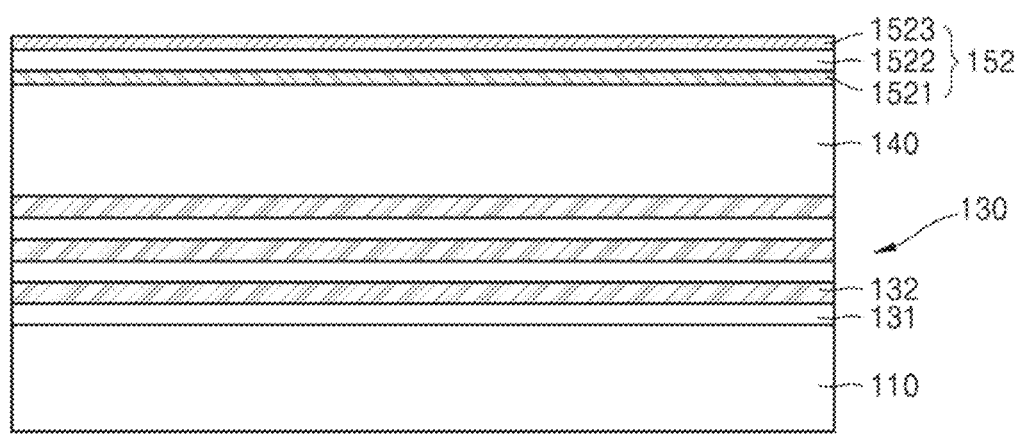

Referring to FIG. 11C, the semiconductor layer 152 may be arranged on the cavity layer 140. The semiconductor layer 152 may be formed by sequentially stacking an n-type semiconductor layer 1521, an intrinsic semiconductor layer 1522, and a p-type semiconductor layer 1523 on the cavity layer 140. However, the method of forming the semiconductor layer 152 is not limited thereto, and the semiconductor layer 152 may be formed by stacking the intrinsic semiconductor layer 1522 and then doping an n-type material and a p-type material in a lower region and an upper region, respectively.

Figure 11D:
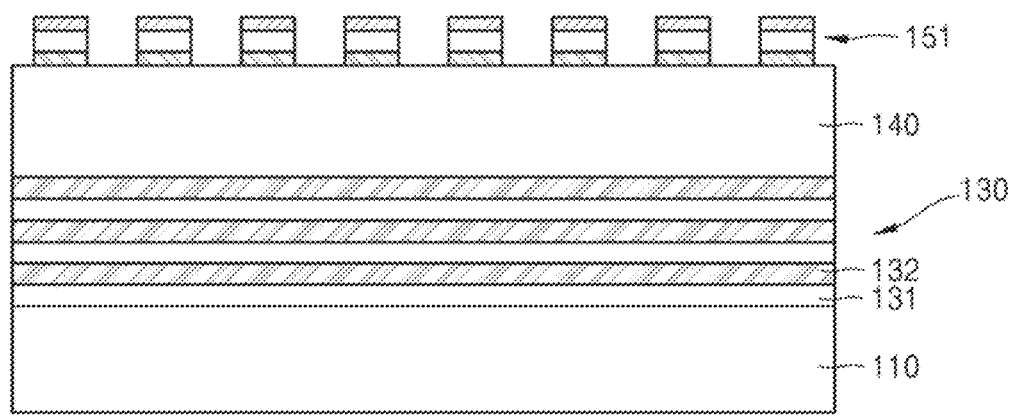

Referring to FIG. 11D, the semiconductor layer 152 may be patterned to form a plurality of unit lattice structures 151 spaced apart from each other. For example, by etching the semiconductor layer 152 by using a mask having a certain pattern, the plurality of unit lattice structures 151 arranged to be spaced apart from each other may be formed.

Figure 11E:
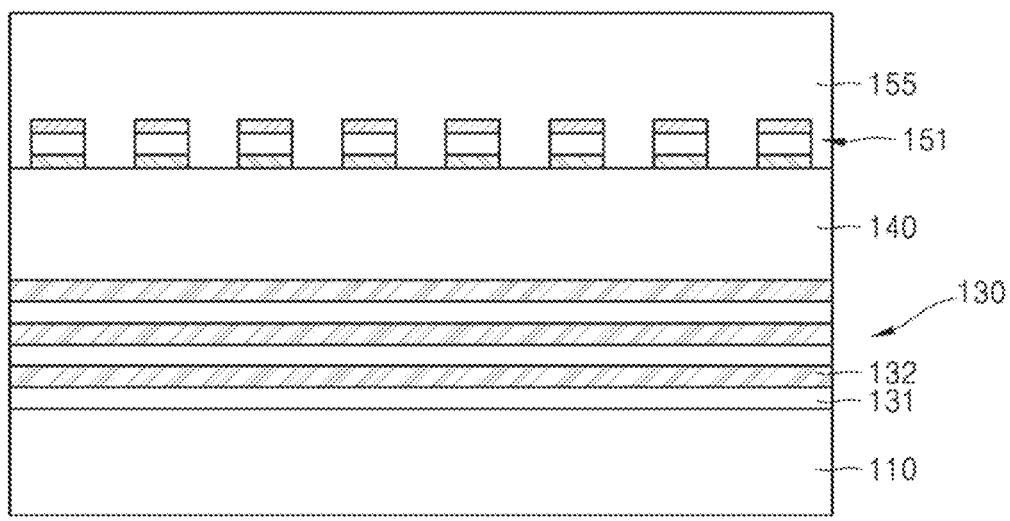

Referring to FIG. 11E, the dielectric 155 may be filled between the plurality of patterned unit lattice structures 151. The dielectric 155 may have a refractive index less than a refractive index of the unit lattice structure material 151. For example, the dielectric 155 may include silicon oxide. The dielectric 155 may be formed of the same material as the cavity layer 140.

Figure 11F:
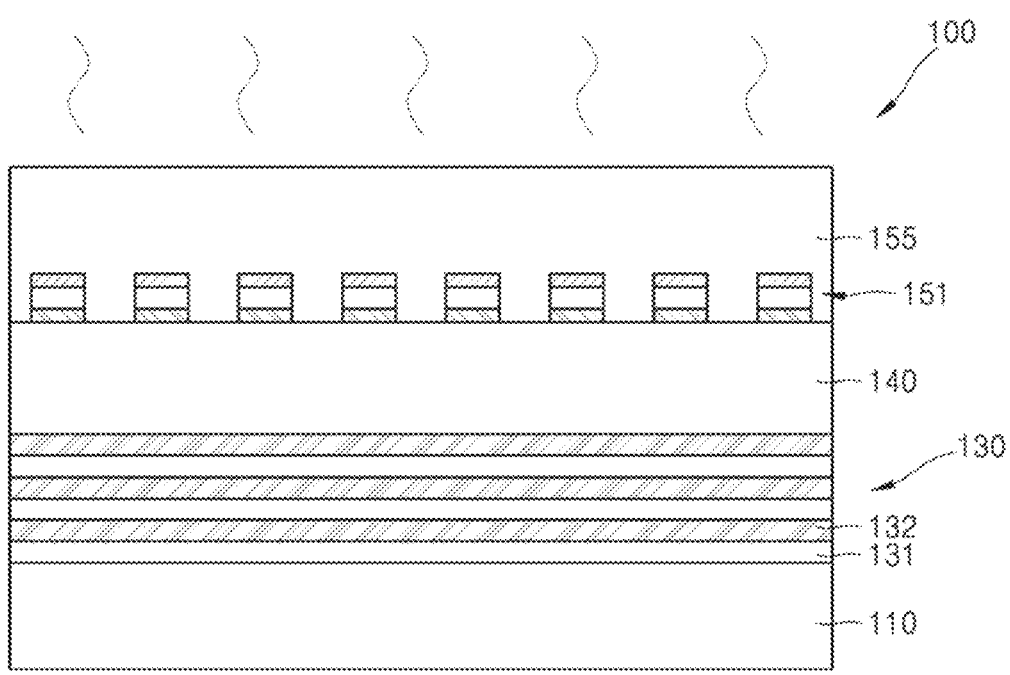

Referring to FIGS. 11F and 6, the plurality of unit lattice structures 151 may have a polycrystalline structure, and a heat treatment may be applied to the polycrystalline structure so that the height H of at least some grains 1510 of the polycrystalline structure is equal to the height H0 of the unit lattice structure material 151. Accordingly, the grain 1510 may have a column shape by increasing crystal size of the unit lattice structure material 151.

A heat treatment for the unit lattice structures 151 may be performed at a low temperature for a long time. For example, the plurality of unit lattice structures 151 may be heated at temperatures of 500° C. to 650° C. for 8 to 12 hours. By doing so, the unit lattice structure material 151 may have a polycrystalline structure having a large crystal size (e.g., a height of 550 nm to 650 nm).

A seed arranged inside the unit lattice structure material 151 may grow in a height direction to form the grain 1510 of a column shape. In this case, the dielectric 155 filled around the unit lattice structures 151 may protect the plurality of unit lattice structures 151 from heat during a heat treatment process.

Figure 12:
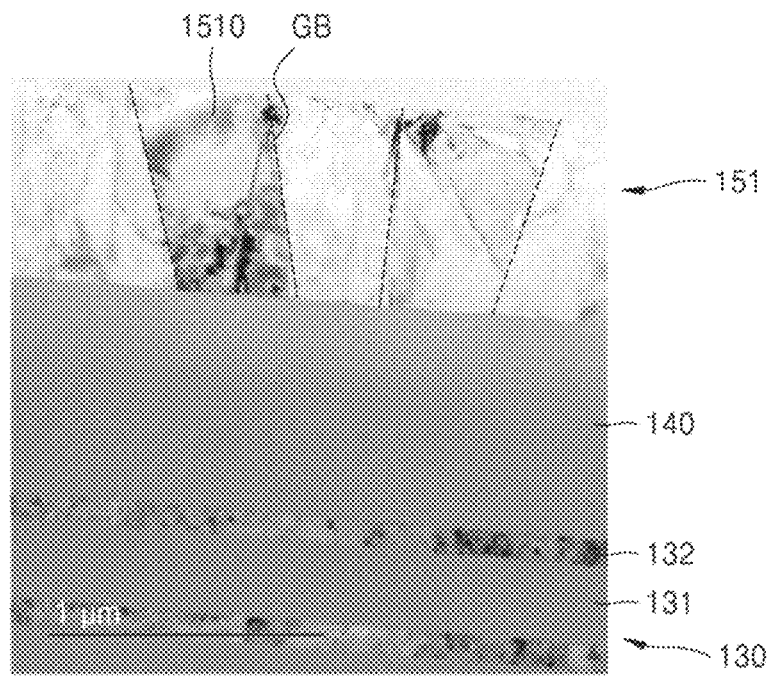
FIG. 12 is a transmission electron microscopes (TEM) image illustrating a unit lattice structure material of a polycrystalline structure to which a heat treatment is applied according to an example embodiment.
Figure 13:
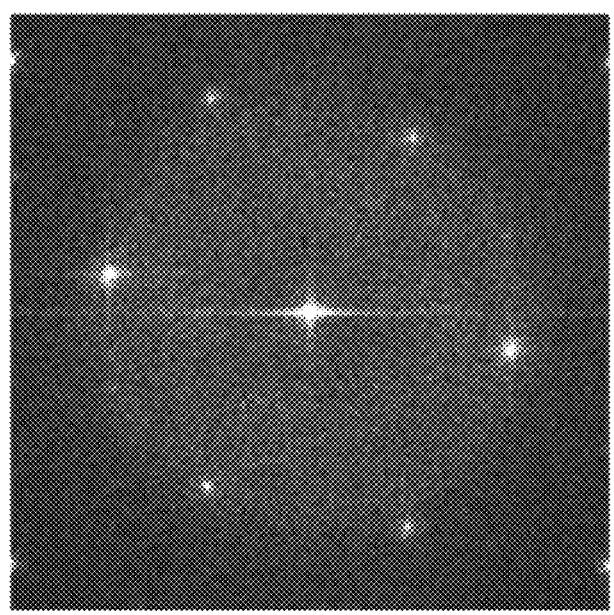
FIG. 13 illustrates a diffraction pattern for grains of a column shape of FIG. 12.
Figure 14:
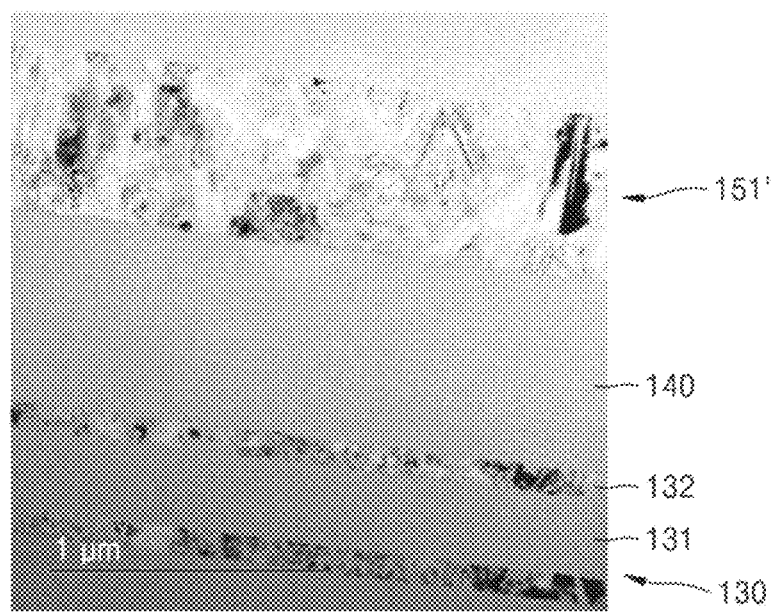
FIG. 14 is a TEM image illustrating a unit lattice structure material in an amorphous state without performing heat treatment according to a comparative example.

FIG. 12 is a transmission electron microscopes (TEM) image illustrating the unit lattice structure material 151 having a polycrystalline structure, to which a heat treatment has been applied according to an example embodiment, and FIG. 13 illustrates a diffraction pattern for the grain 1510 of a column shape of FIG. 12. FIG. 14 is a TEM image illustrating the unit lattice structure material 151' in an amorphous state without heat treatment, according to a comparative example.

Referring to FIG. 12, it may be seen that the grain 1510 of a column shape is formed by a heat treatment performed for a long time (e.g., 8 to 12 hours) at a low temperature (e.g., 500° C. to 650° C.), until a grain boundary GB extends from a lower end facing the cavity layer 140 of the unit lattice structure material 151 to an upper end of the unit lattice structure material 151, and the unit lattice structure material 151 has a polycrystalline structure with a relatively large crystal size (e.g., a height of 550 nm to 650 nm). Referring to FIG. 13, it may be seen that the grain 1510 of a column shape is a single grain 1510 and not a plurality of grains 1510.

It may be seen that, when the heat treatment is not performed, the unit lattice structure material 151' is in an amorphous state as illustrated in FIG. 14.

In the example embodiment described above, a method of depositing the semiconductor layer 152 and patterning the semiconductor layer 152 to form the second reflective layer 150 having the plurality of unit lattice structures 151 is described. However, the method of forming the plurality of unit lattice structures 151 is not limited thereto, and a method of directly growing the plurality of unit lattice structures 151 on the cavity layer 140 may be used therefor.

Meanwhile, a step of performing the heat treatment of the plurality of unit lattice structures 151 may further include a high-temperature heat treatment step of performing heating at a high temperature for a short time after the low-temperature heat treatment step described above.

The high-temperature heat treatment may be performed at 750° C. or more within 10 minutes. The high-temperature heat treatment is may be performed at 900° C. or less 1 minute or more.

Figure 15:
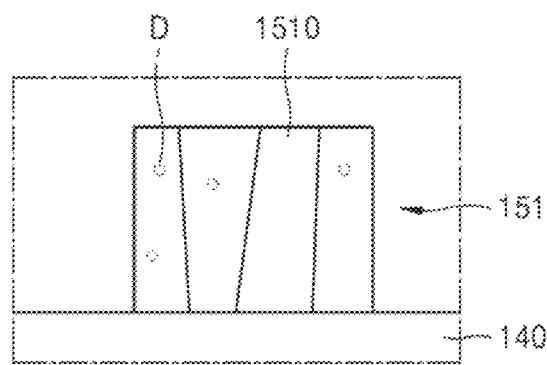
FIG. 15 is a view illustrating a high-temperature heat treatment step for a unit crystal structure according to an example embodiment.

Few defects D may remain in the unit lattice structure material 151 in which the above-described low-temperature heat treatment is completed as illustrated in FIG. 15. However, the defects D remaining inside the unit lattice structure material 151 may be removed by the high-temperature heat treatment described above, and crystallinity of the unit lattice structure material 151 may be further increased.

Figure 16:
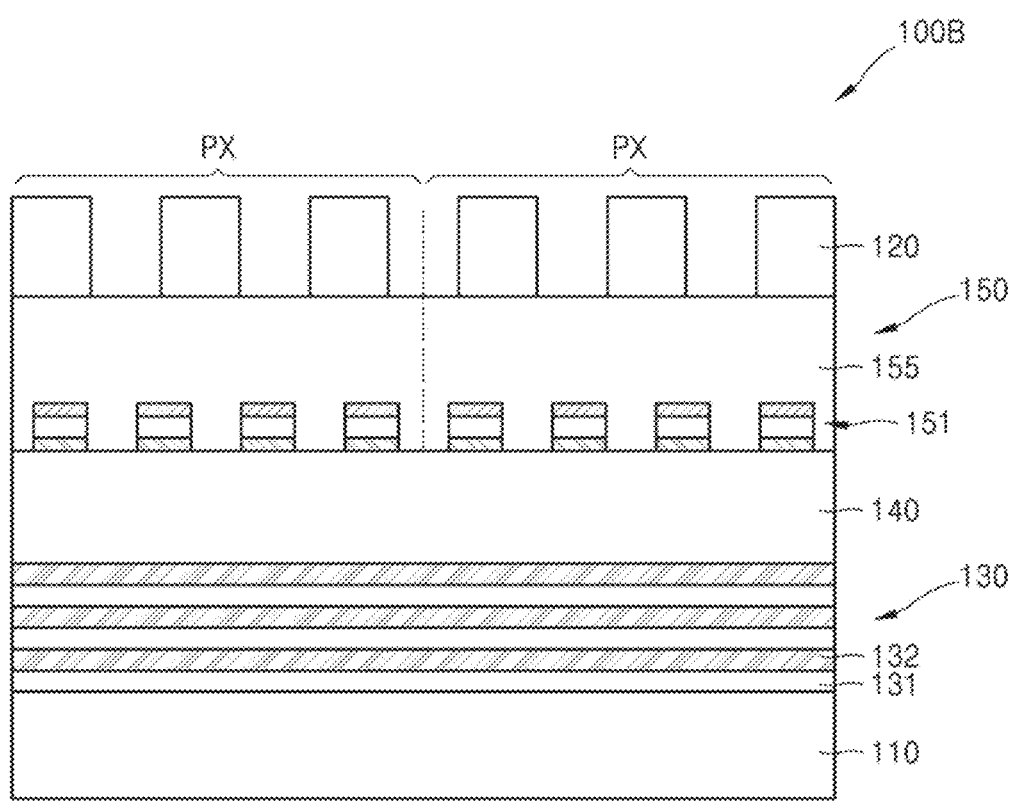
FIG. 16 is a view illustrating an optical modulator according to another example embodiment.
Figure 17:
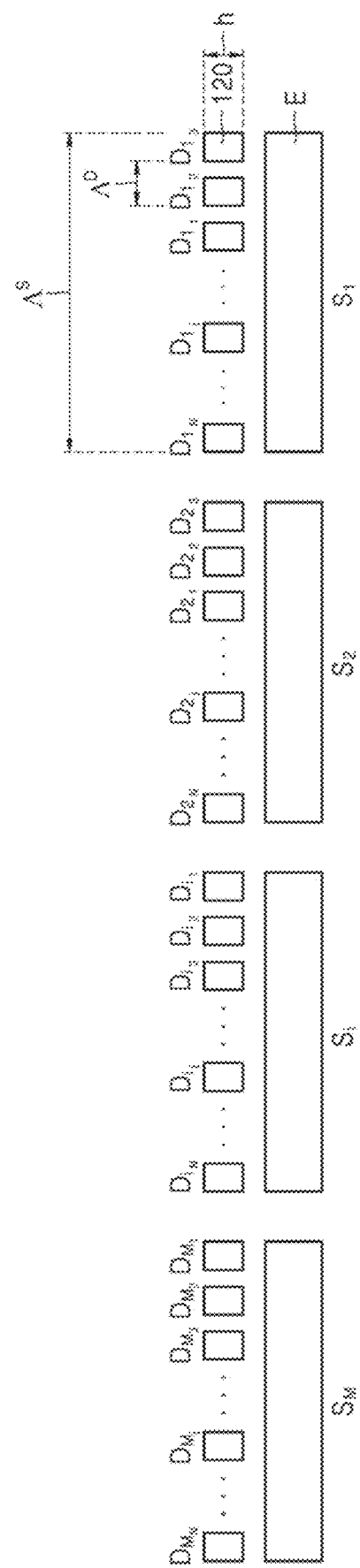
FIG. 17 illustrates in one dimension an arrangement of nanostructures in each pixel.

FIG. 16 is a view illustrating a spatial light modulator 100B according to another example embodiment. FIG. 17 illustrates in one dimension an arrangement of nanostructures 120 in each pixel. FIG. 17 illustrates configuration elements E under the nanostructures 120 as one box for the sake of convenience. The configuration elements E may include the first reflective layer 130, the cavity layer 140, and the second reflective layer 150 as illustrated in FIG. 16. There are a first pixel $S_1$, a second pixel $S_2$, ... an $M^{th}$ pixel $S_M$, and for example, the first pixel S1 may include the configuration elements E and the nanostructures 120 arranged corresponding thereto. It is assumed that the number of nanostructures 120 in each pixel is N, an interval between adjacent nanostructures 120 is $\Lambda_D$, and a pitch between adjacent pixels is $\Lambda_S$. In FIG. 17, the interval between the nanostructures 120 is constant. Here, $\Lambda_S = N \times \Lambda_D$.

The nanostructure material 120 may include a dielectric material with a high refractive index and a low loss. The nanostructure material 120 may include, for example, a dielectric with a refractive index in a range of 1.9 to 4.0. The nanostructure material 120 may include at least one of, for example, Si, Ge, SiGe, GaAs, Si3N4, TiO2, GaP, and InSb, or a combination thereof.

When a wavelength of light used by the spatial light modulator 100B is referred to as $\lambda$ and a refractive index of the nanostructure material 120 is referred to as n, an arrangement interval $\Lambda_D$ of the nanostructure material 120 may be in a range of $\lambda/(2n)$-$(5\lambda/2n)$. In addition, when the wavelength of light used by the spatial light modulator 100B is referred to as $\lambda$ and the refractive index of the nanostructure material 120 is referred to as n, a height h of the nanostructure material 120 may be in a range of $(3\lambda/2n)$-$(7\lambda/2n)$. The nanostructure material 120 may increase light transmission characteristics to increase light efficiency. The nanostructure material 120 may also widen a field of view (FOV) of light. The spatial light modulator 100B according to an example embodiment may change the FOV. For example, the FOV may be adjusted while maintaining intensity of light by adjusting a size of a cylinder. The FOV may be adjusted by arranging the nanostructures 120 by using a combination of a shape and an arrangement interval of the nanostructures 120 and a size of the nanostructure material 120.

Spatial light modulators according to the various example embodiments described above may be employed in a beam steering apparatus such as a three-dimensional (3D) sensor such as a light detection and ranging (LiDAR) device for vehicle or a depth sensor used for a 3D camera to increase precision.

The beam steering apparatus according to various example embodiments may be used for LiDAR for robots, LiDAR for drones, an intruder detection system for security, a subway screen door obstacle detection system, a depth sensor, a sensor for user face recognition in a mobile phone, augmented reality (Ar), motion recognition and object profiling in TV or game device, and so on in addition to the vehicle LiDAR.

Figure 18:
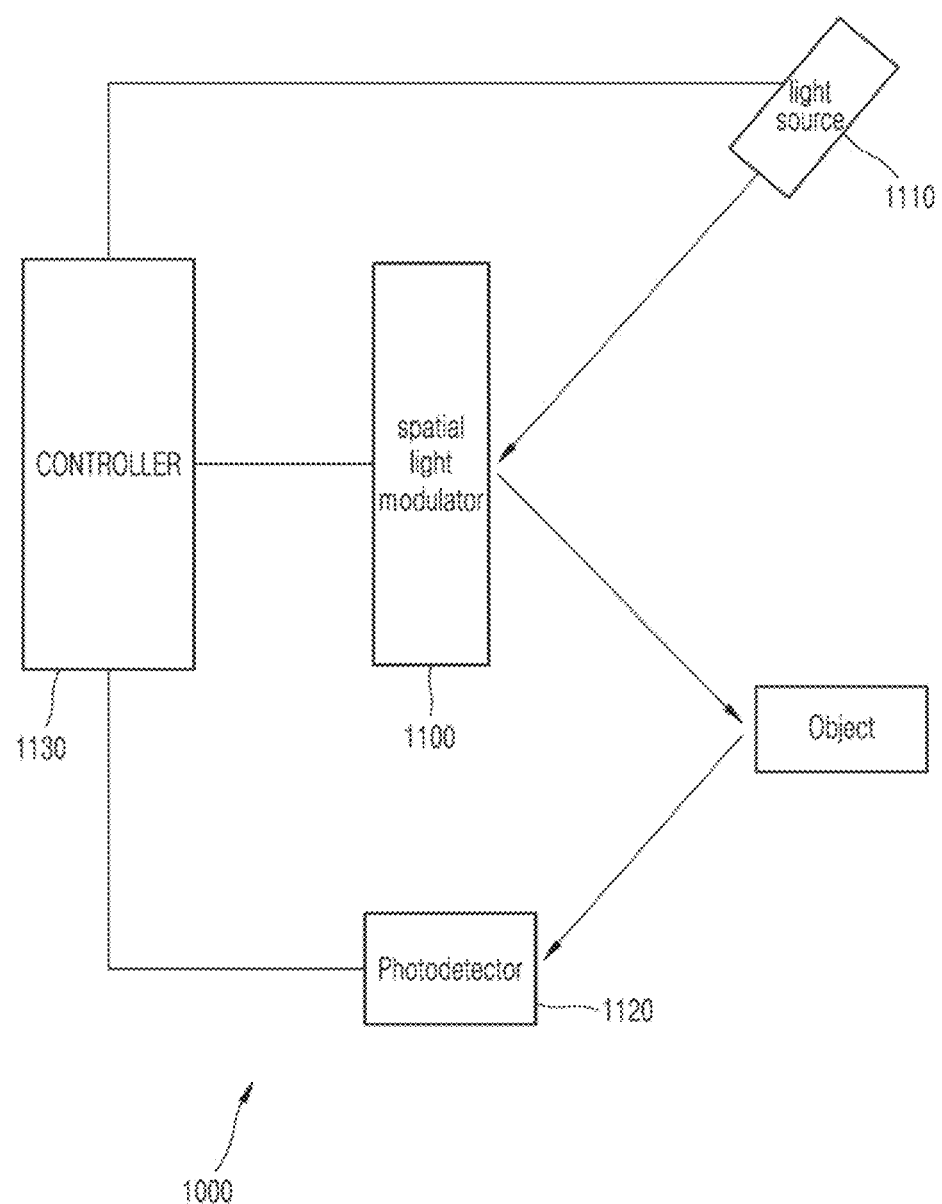
FIG. 18 schematically illustrates a configuration of a beam steering apparatus including a spatial light modulator according to an example embodiment.

For example, FIG. 18 is a block diagram schematically illustrating a configuration of a beam steering apparatus 1000 according to an example embodiment.

Referring to FIG. 18, the beam steering apparatus 1000 according to the example embodiment may include a light source 1110 that emits light, a spatial light modulator 1100 that adjusts a travelling direction of light incident from the light source 1110, a photodetector 1120 that detects light emitted from the spatial light modulator 1100 and reflected from an object, and a controller 1130 that controls the spatial light modulator 1100.

The light source 1110 may include, for example, a light source that emits visible light, a laser diode (LD) that emits near-infrared rays in a band of approximately 800 nm to approximately 1500 nm, or a light emitting diode (LED).

The spatial light modulator 1100 may include the example embodiments described with reference to FIGS. 1 to 17. The spatial light modulator 1100 may adjust a travelling direction of a light beam by modulating a phase for each pixel. The spatial light modulator 1100 may scan light with a wide viewing angle.

The controller 1130 may control operations of the spatial light modulator 1100, the light source 1110, and the photodetector 1120. For example, the controller 1130 may control ON/OFF operations of the light source 1110 and the photodetector 1120 and a beam scanning operation of the spatial light modulator 1100. In addition, the controller 1130 may calculate information on an object based on a measurement result of the photodetector 1120.

The beam steering apparatus 1000 may periodically emit light to several surrounding regions by using the spatial light modulator 1100 to obtain information on objects at a plurality of peripheral positions.

Figure 19:
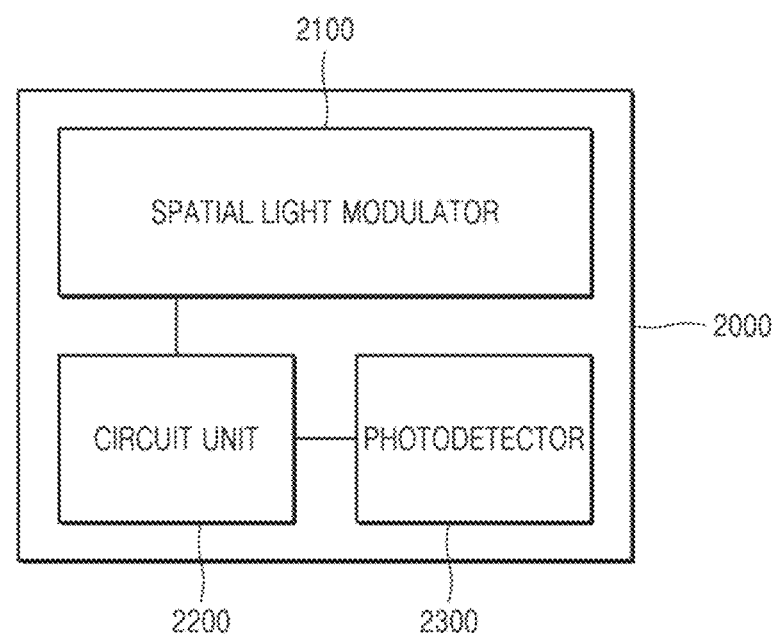
FIG. 19 schematically illustrates a beam steering apparatus including a spatial light modulator according to another example embodiment.

As illustrated in FIG. 19, the beam steering apparatus 2000 may include a spatial light modulator 2100 and a photodetector 2300 that detects light adjusted by the spatial light modulator 2100 in a travelling direction and reflected by an object. The beam steering apparatus 2000 may further include a circuit unit 2200 connected to at least one of the spatial light modulator 2100 and the photodetector 2300. The circuit unit 2200 may include an arithmetic unit that obtains and calculates data and may further include a drive unit and a controller. In addition, the circuit unit 2200 may further include a power supply unit and a memory.

FIG. 19 illustrates a case in which the beam steering apparatus 2000 includes the spatial light modulator 2100 and the photodetector 2300 within one device, but the spatial light modulator 2100 and the photodetector 2300 are not provided as one device and may be provided separately in separate devices. In addition, the circuit unit 2200 may be connected to the spatial light modulator 2100 or the photodetector 2300 via wire, or alternatively, wirelessly connected to the spatial light modulator 2100 or the photodetector 2300 without being connected by wire. In addition, a configuration of FIG. 19 may be modified in various ways.

The spatial light modulator according to the example embodiment described above may be applied to various systems. As an example, the spatial light modulator according to the embodiment may be applied to a LiDAR device. The LiDAR device may be a phase-shift device or a time-of-flight (TOF) device. The LiDAR device may be applied to an autonomous vehicle, a flying object such as a drone, a mobile device, a small walking apparatus (for example, bicycle, motorcycle, stroller, board, and so on), a robot, a human/animal assistance apparatus (for example, cane, helmet, jewelry, clothing, watch, bag, and so on), Internet of things (IoT) device/system, security device/system, and so on.

Figure 20:
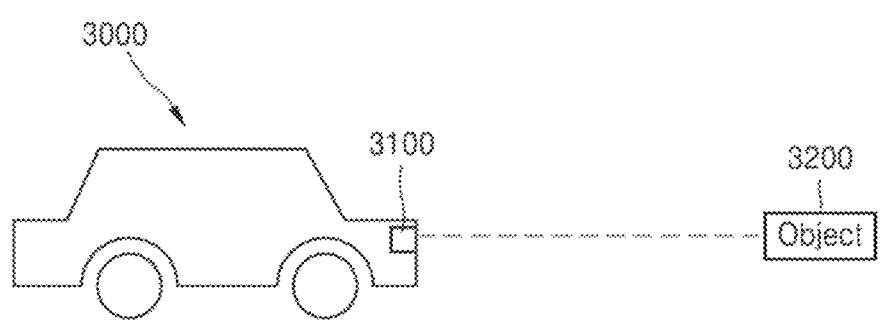
FIGS. 20 and 21 are conceptual views illustrating a case in which a vehicle includes a LiDAR device including a beam steering apparatus according to an example embodiment.
Figure 21:
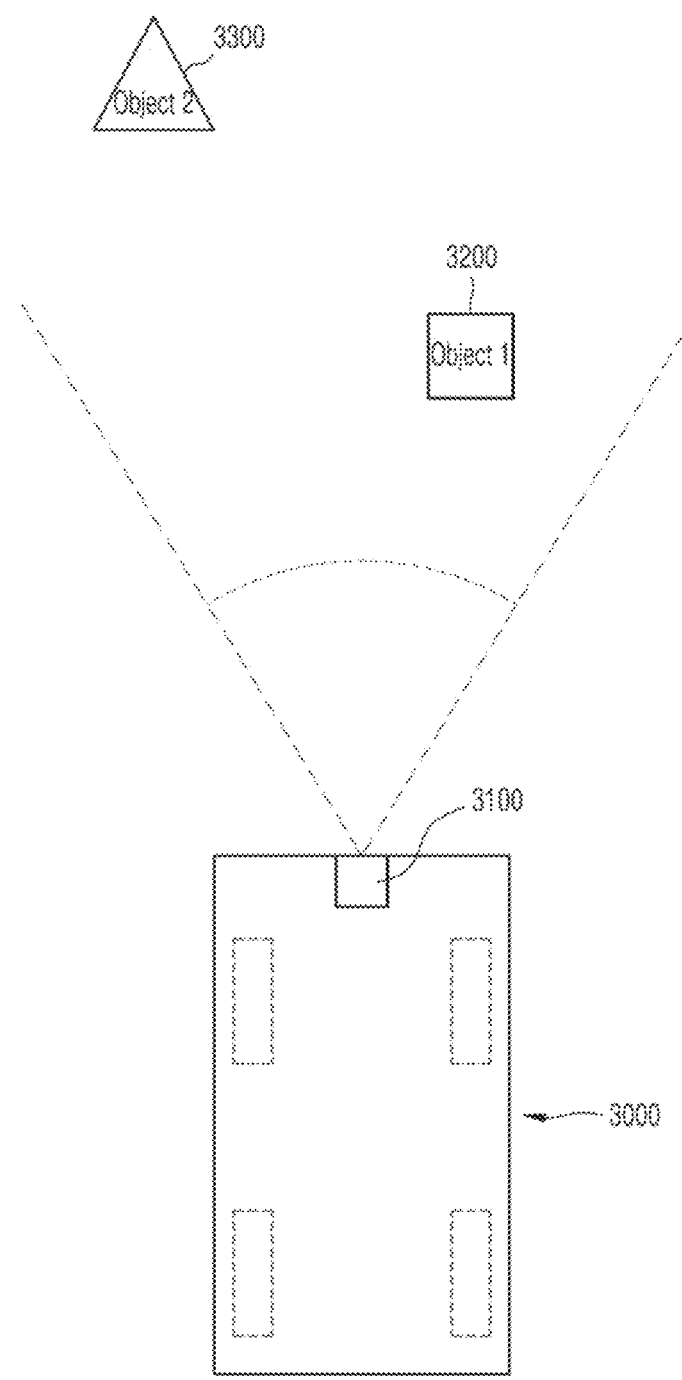

FIGS. 20 and 21 are conceptual views illustrating a case in which a LiDAR device including the beam steering apparatus according to the example embodiment is applied to a vehicle. FIG. 20 is a view viewed from a side, and FIG. 21 is a view viewed from above.

Referring to FIG. 20, a LiDAR device 3100 may be applied to a vehicle 3000, and information on an object 3200 may be obtained by using the LiDAR device. The vehicle 3000 may have an autonomous driving function. The LiDAR device 3100 may be used to detect an object or a person, that is, the object 3200 in a direction in which the vehicle 3000 travels. Further, a distance to the object 3200 may be measured by using information such as a time difference between a transmission signal and a detection signal. In addition, as illustrated in FIG. 21, information on a nearby object (i.e., object 1) 3200 and a distant object (i.e., object 2) 3300 within a scan range may be obtained.

The beam steering apparatus according to various example embodiments may be applied to various systems other than LiDAR. For example, when using a beam steering apparatus according to various example embodiments, 3D information on a space and an object may be obtained through scanning, and thus, the beam steering apparatus may be applied to a 3D image acquisition device, a 3D camera, or so on. In addition, the beam steering apparatus may also be applied to a holographic display device and a structured light generation device. In addition, the beam steering apparatus may be applied to various optical devices such as a hologram generation device, a light coupling device, a variable focus lens, and a depth sensor. In addition, the beam steering apparatus may be applied to various fields in which a meta surface or a meta structure is used. In addition, the spatial light modulator and the beam steering apparatus including the same according to the example embodiments may be applied to various optical and electronic devices for various purposes.

A spatial light modulator and a beam steering apparatus according to an example embodiment may obtain a high phase by increasing a change in refractive index of a reflective layer and may easily drive individual pixels to increase a beam steering speed.

A method of manufacturing a spatial light modulator according to an example embodiment may provide a spatial light modulator capable of increasing a change in refractive index of a reflective layer.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A spatial light modulator comprising:
   a first reflective layer;
   a cavity layer provided on the first reflective layer; and
   a second reflective layer including a plurality of unit lattice structures that are provided on the cavity layer and spaced apart from each other,
   wherein each of the plurality of unit lattice structures has a polycrystalline structure, and at least one grain of the polycrystalline structure has a column shape and a height equal to a height of the plurality of unit lattice structures.

2. The spatial light modulator of claim 1, wherein each of the plurality of unit lattice structures has the polycrystalline structure in which a number of grains is less than or equal to 5.

3. The spatial light modulator of claim 1, wherein a width of each of the plurality of unit lattice structures is less than or equal to 500 nm, and
   wherein a width of the at least one grain is greater than or equal to 100 nm.

4. The spatial light modulator of claim 1, wherein the plurality of unit lattice structures include silicon (Si).

5. The spatial light modulator of claim 4, wherein the plurality of unit lattice structures are PIN diodes.

6. The spatial light modulator of claim 1, wherein the second reflective layer further includes a dielectric material that is filled between the plurality of unit lattice structures and has a refractive index that is less than refractive indices of the plurality of unit lattice structures.

7. The spatial light modulator of claim 1, wherein the cavity layer includes silicon oxide ($SiO_2$).

8. The spatial light modulator of claim 1, wherein the first reflective layer is a distributed Bragg reflector.

9. The spatial light modulator of claim 8, wherein the first reflective layer includes first layers and second layers that are alternately stacked with each other, and
   each of the first layers comprises one of silicon (Si), silicon nitride ($Si_3N_4$), silicon oxide ($SiO_2$), and titanium oxide ($TiO_2$), and each of the second layers comprises another one of silicon (Si), silicon nitride ($Si_3N_4$), silicon oxide ($SiO_2$), and titanium oxide ($TiO_2$).

10. A beam steering apparatus comprising:
a light source configured to emit light;
a spatial light modulator configured to transmit the light to an object by adjusting a travelling direction of the light emitted from the light source;
a photodetector configured to detect the light reflected from the object; and
a controller configured to control the spatial light modulator,
wherein the spatial light modulator comprises:
a first reflective layer;
a cavity layer provided on the first reflective layer; and
a second reflective layer including a plurality of unit lattice structures that are provided on the cavity layer and spaced apart from each other, and
wherein each of the plurality of unit lattice structures has a polycrystalline structure, and at least one grain of the polycrystalline structure has a column shape and a height equal to a height of the plurality of unit lattice structures.

11. A method of manufacturing a spatial light modulator, the method comprising:
providing a cavity layer on a first reflective layer; and
providing a second reflective layer on the cavity layer, the second reflective layer including a plurality of unit lattice structures that are spaced apart from each other,
wherein the providing of the second reflective layer comprises performing a heat treatment so that each of the plurality of unit lattice structures has a polycrystalline structure and at least one grain of the polycrystalline structure has a column shape and a height equal to a height of the plurality of unit lattice structures.

12. The method of manufacturing the spatial light modulator of claim 11, wherein the providing of the second reflective layer further comprises:
depositing a semiconductor layer on the cavity layer;
patterning the semiconductor layer to form the plurality of unit lattice structures spaced apart from each other; and
applying the heat treatment to the plurality of unit lattice structures.

13. The method of manufacturing the spatial light modulator of claim 12, wherein the applying the heat treatment comprises heating the plurality of unit lattice structures at a temperature of 500° C. to 650° C. for 8 hours to 12 hours.

14. The method of manufacturing the spatial light modulator of claim 13, wherein the applying the heat treatment further comprises heating the plurality of unit lattice structures at a temperature of at least 750° C. within 10 minutes.

15. The method of manufacturing the spatial light modulator of claim 11, wherein each of the plurality of unit lattice structures has the polycrystalline structure in which a number of grains is less than or equal to 5.

16. The method of manufacturing the spatial light modulator of claim 11, wherein a width of each the plurality of unit lattice structures is less than or equal to 500 nm, and
wherein a width of the at least one grain is greater than or equal to 100 nm.

17. The method of manufacturing the spatial light modulator of claim 11, further comprising:
forming a dielectric between the plurality of unit lattice structures, the dielectric having a refractive index that is less than refractive indices of the plurality of unit lattice structures.

18. The method of manufacturing the spatial light modulator of claim 11, wherein the plurality of unit lattice structures are PIN diodes.

19. The method of manufacturing the spatial light modulator of claim 11, wherein the cavity layer includes silicon oxide ($SiO_2$).

20. The method of manufacturing the spatial light modulator of claim 11, wherein the first reflective layer is a distributed Bragg reflector.

* * * * *